(12) United States Patent
Basfar et al.

(10) Patent No.: US 8,691,135 B2
(45) Date of Patent: Apr. 8, 2014

(54) METHOD OF FORMING A FILM OF NOVEL COMPOSITION FOR A DOSIMETER

(75) Inventors: Ahmed A Basfar, Riyadh (SA); Khalid A Raba'eh, Zarqa (JO)

(73) Assignee: King Abdulaziz City for Science and Technology (KACST), Riyadh (SA)

( * ) Notice: Subject to any disclaimer, the term of this patent is extended or adjusted under 35 U.S.C. 154(b) by 442 days.

(21) Appl. No.: 13/154,336

(22) Filed: Jun. 6, 2011

(65) Prior Publication Data

US 2011/0233815 A1     Sep. 29, 2011

(51) Int. Cl.
*B29C 39/00* (2006.01)
*G01N 21/75* (2006.01)

(52) U.S. Cl.
USPC ............ 264/299; 264/160; 436/164; 436/166

(58) Field of Classification Search
None
See application file for complete search history.

(56) References Cited

U.S. PATENT DOCUMENTS 3,887,374 A * 6/1975 Brongo et al. ................ 430/147

OTHER PUBLICATIONS

A.K. Pikaev, Z.K. Kriminskaya, Use of tetrazolium salts in dosimetry of ionizing radiation, Radiation Physics and Chemistry, vol. 52, Issues 1-6, Jun. 1998, pp. 555-561, ISSN 0969-806X, http://dx.doi.org/10.1016/S0969-806X(98)00094-2. (http://www.sciencedirect.com/science/article/pii/S0969806X98000942).*
Sharpe et al., The effect of irradiation temperatures between ambient and 80C on the response of alanine dosimeters, Radiation Physics and Chemistry, 78(2009) pp. 473-475.
Levine et al., Temperature and Humidity Effects on the Gamma-Ray Response and Stability of Plastic and Dyed Plastic Dosimeters, Radiat. Phys. Chem. vol. 14, pp. 551-574.

* cited by examiner

*Primary Examiner* — Benjamin Schiffman
(74) *Attorney, Agent, or Firm* — Geeta Kadambi; Riddhi IP LLC

(57) ABSTRACT

A tetrazolium bromide dye, e.g., 3-(4,5-Dimethylthiazol-2-yl)-2,5-diphenyltetrazolium bromide (MTT), to be used as a high dose solution dosimeter is disclosed. The dose response of MTT solution dosimeter increases strongly with increase of absorbed dose up to 1 kGy. In order to increase the dose range and for ease of handling the present dosimeter as routine dosimeter, MTT-polyvinyl alcohol (PVA) film dosimeter is used. The dose response of MTT-PVA film dosimeters increases strongly with increase of absorbed dose up to 25 kGy. Polyvinyl butyral (PVB) as a polymer for making a film provides more stability at higher temperatures and humidity levels and less calibration is required. The dose response of MTT-PVB film dosimeters is effective with absorbed dose of up to 100 kGy. The effects of irradiation temperature, relative humidity, dose rate and the stability of the response of the films after irradiation were investigated and found that these films could be used as a routine dosimeter in industrial irradiation processing measurements.

10 Claims, 14 Drawing Sheets

METHOD OF FORMING A FILM OF NOVEL COMPOSITION FOR A DOSIMETER

FIELD OF TECHNOLOGY

The present disclosure relates to a novel composition and film to be used for dosimeter and Radio-chromic dosimeter (radiation induced coloration) for use in high dose radiation processing such as sterilization, food irradiation, agriculture, and polymers treatment. More specifically method of making Radio-chromic solution dosimeters, Polyvinyl alcohol (PVA) film dosimeters and polyvinyl butyral (PVB) film dosimeters containing novel composition of 3-(4,5-Dimethylthiazol-2-yl)-2,5-diphenyltetrazolium bromide (MTT).

BACKGROUND

The energy imparted to matter by ionizing radiation per unit mass of irradiated material at the point of interest is called the 'absorbed dose' or dose and the unit is given in gray (Gy) or J/kg. The dose can be calculated by knowing the energy of the radiation and the composition of the medium, which then leads to the formation of dosimeters. A dosimeter is defined as a device that when irradiated, exhibits a quantifiable and reproducible change in physical or chemical property of the device which can be related to the dose in a given material using appropriate analytical techniques.

Dosimetry plays an important role in process control in irradiation facility where documents are required to assure that all the factors which might influence the level of uncertainty in absorbed dose estimation, and precautions should be taken to minimize the uncertainties (ASTM. Standard Guide for Performance Characterization of Dosimeters and dosimetry Systems for Use in Radiation Processing. ASTM E2701). The importance of dosimetry is emphasized in the standards on radiation sterilization which are currently drafted by the European standards organization CEN and by the international standards organization ISO. In both standards, dosimetry plays key roles in characterization of the facility, in qualification of the process and in routine process control. As a function of the work on the standards, several issues are now receiving major attention. These include traceability and uncertainty limits of the dose measurements, calibration procedures, environmental influence and combination of influence factors such as dose rate and temperature. The increased attention to these factors has increased the demands on existing dosimeter systems, and need for more sensitive chemical composition to help these dosimeters.

SUMMARY

The present disclosure describes a composition, process and method for a new solution and a film to be used as dosimeters. More specifically, as an embodiment, a radio-chromic dosimeter for radiation processing especially in food irradiation and sterilization of medical disposables are disclosed. In one embodiment, a composition for a new type of dye comprises of 3-(4,5-Dimethylthiazol-2-yl)-2,5-diphenyltetrazolium bromide (MTT) solution. MTT dye is heterocyclic organic compound, which upon irradiation yield highly colored water insoluble formazans due to radiolytic reduction of these compounds by hydrated electrons or hydroxyalkyl radicals. In one embodiment, the colorless and transparent form of MTT solution undergoes a permanent color change after exposure to high irradiation dose. In another embodiment, various concentrations of the dye in vials as dosimeter solution are optimized for irradiation dose response.

In another embodiment, a composition of a tetrazolium dye solution, a polymer solution and a solvent is disclosed. In another embodiment, polyvinyl alcohol is used as a polymer to make the dosimeter film using a solvent. In another embodiment, polyvinyl butyral is used as a polymer to make the dosimeter film using a solvent. MTT, in one embodiment is mixed with the polymer to form a film. MTT-polyvinyl alcohol (MTT-PVA) film dosimeters and MTT polyvinyl butyral (MTT-PVB) film dosimeters are disclosed as another embodiment.

In one embodiment, both the solution and film dosimeters were prepared by adding variable concentrations of MTT dye using ethanol as solvent. In another embodiment, the dosimeters were irradiated with γ-ray from $^{60}$Co source up to 1 kGy for MTT solution dosimetrs, 25 kGy for MTT-PVA films and 100 kGy for MTT-PVB films. UV/VIS spectrophotometry was used to investigate the optical density of unirradiated and irradiated films in terms of absorbance at the range 350-650 nm, more specifically 560 nm.

In one embodiment, dose sensitivity of solution and films of MTT dosimeters was optimized and observed that it increased significantly with increase of concentration of MTT dye. In one embodiment, the effects of irradiation temperature, humidity, dose rate and the stability of the response of the films after irradiation were optimized. In one embodiment, the influence of irradiation temperature and humidity on the performance of the film was reduced significantly due to the use of PVB as a binder containing MTT dye.

In another embodiment, a method of use of the MTT solution, MTT-PVA film and MTT-PVB film as a dosimeter for irradiation measurement is disclosed. In another embodiment, an optimal thickness of the MTT-PVA film and MTT-PVB film is disclosed.

DETAILED DESCRIPTION

Figure 1:
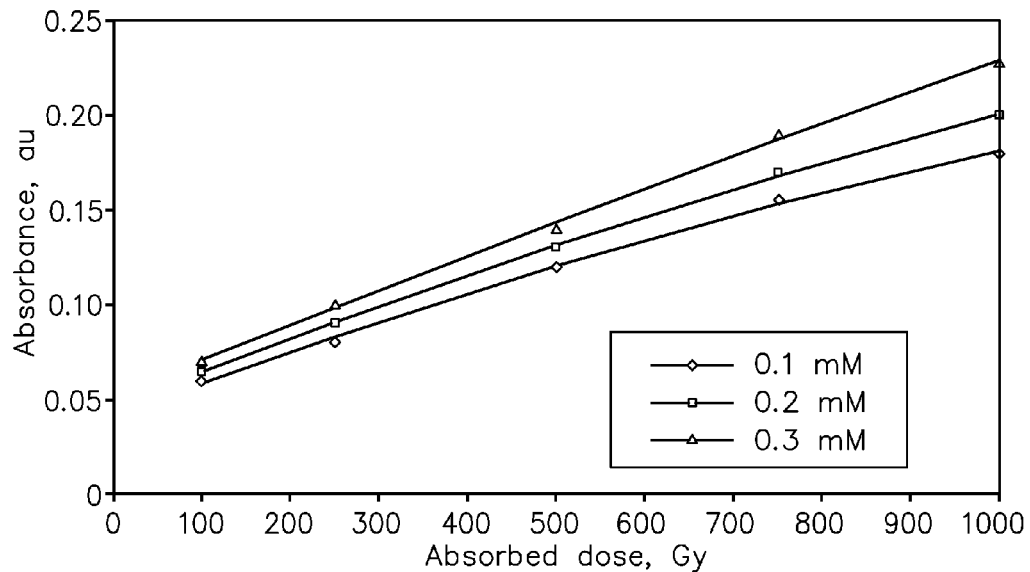
FIG. 1 Absorbance at 560 nm of 0.1, 0.2, and 0.3 mM of MTT solution dosimeter as a function of absorbed dose.

Radio chromic films are one category of dosimeters which depend on permanent change in color when exposed to high-dose radiation (Holm, N. W. Berry, R. J. (Eds.), 1970a. Film, Dyes and Photographic Systems, Manual on Radiation Dosimetry, Marcel Dekker, New York and Holm, N. W. Berry, R. J. (Eds.), 1970b Film, Radio-chromic Dye-Cyanide Dosimeters, Manual on Radiation Dosimetry, Marcel Dekker, New York). The advantage of radio-chromic film compared to traditional point measurements dosimeters such as ionization chamber is the ability to produce a two-dimensional (2D) optical density map, with appropriate corrections, this can be converted to a 2D dose map. In addition, these dosimeters have a very high spatial resolution and relatively low-energy spectral sensitivity.

Tetrazolium salts are chemical compounds used long time ago in biological applications to highlight reduction chemical reactions which take place in life cells especially reactions with enzymes in the biological applications. These are dyes which change their colors when chemical reduction reactions take place. Most of these tetrazolium salts are colorless or have very light yellow colors which change to blue or violet colors after chemical reduction reactions, when the chemical form of tetrazolium changes to formazan. Formazans are very stable in color and insoluble in water.

A new radio-chromic dosimeters composition based on tetrazolium dye (MTT) solution dosimeters, MTT-PVA and MTT-PVB film dosimeters are disclosed in the instant application. The solution of MTT dye was prepared by dissolving different weights of MTT (EMD, USA) in 96% ethanol to obtain different concentrations of MTT i.e. 0.1, 0.2 and 0.3 mM. The solution was stirred at room temperature for 3 hours to ensure a homogenous dye solution. The solutions were kept in 3 ml sealed glass ampoules tubes and stored in the dark at room temperature (23±1° C.). The pH of the solutions was set with HCl and NaOH, respectively.

In one embodiment, as a method, dye solutions were irradiated with 1.25 MeV gamma-ray from $^{60}$Co source Model GC-220 supplied by MDS Nordion, Canada at a mean dose rate of 8.6 kGy/h which connected to air chiller system, Turbo-Jet (Kinetics, USA) in order to monitor the temperature during irradiation. The dose rate of the source was calibrated using ferrous sulphate dosimeter or fricke dosimeter (ASTM Standard Practice E1026, 2004). At each dose point, three films were sandwiched together between two polystyrene (PS) blocks with 6 mm thickness in order to establish secondary charged particle equilibrium and the average is reported. The PS blocks were positioned at the center where absorbed dose is uniform. Electron beam irradiation was conducted at Sure Beam Middle East Corp. (SBE) irradiation facility in Riyadh, Saudi Arabia with two electron beam accelerators positioned vertically (tower and bit) at dose rate of 1 kGy/s and at room temperature. The electron beam parameters are listed in Table 1 below. Alanine pellet dosimeters were used as a reference dosimeter irradiated along invented films in accordance with ISO/ASTM 51607. Alanine pellet dosimeters are traceable to National Institute of Standard and Technology (NIST) in USA. Alanine dosimeters are measured by E-Scan EPR spectrometer (Bruker Biospin Company, Germany). Similar to gamma irradiation, three films were sandwiched together between two PS blocks in order to maintain electronic equilibrium during EB irradiation. The PS blocks were placed on the tray of conveyor system of EB accelerator

TABLE 1

| Electron beam system operating parameters | | |
|---|---|---|
| Parameter | Tower | Pit |
| Beam Energy (MeV) | 10 | 10 |
| Average Beam Current (mA) | 1.43 | 1.6 |
| Average Beam Power (kW) | 14.3 | 16 |
| Scan Magnet Current (A) | 233 | 200 |
| Scan Width (cm) | 120 | 120 |
| Pulse Per Scan | 64 | 64 |
| Scan Frequency (Hz) | 5.05 | 5.26 |
| Pulse Repetition Rate (Hz) | 288 | 302 |

UV/VIS spectrophotometer is used to measure the absorbance of spectra of radiation in the near infrared (700-1100 nm), visible (350-700 nm) and ultra violet (190-350) nm regions. The absorption spectra of irradiated MTT samples in the wavelength range from 350-650 nm were measured using UV/VIS spectrophotometer, model Lambda 850, from Perkin-Elmer, USA. Three samples at each absorbed dose were measured, but no significant differences in their characteristics were found during measurements.

The effect of the dye concentrations on the response of the dosimeter solutions was investigated at fixed irradiation temperature (i.e. 25±1° C.) and at (pH=5.6). The dose response curves were established in terms of change in absorption peak measured at 560 nm versus the absorbed dose. FIG. 1. shows that the dose response of different concentrations of MTT dye in the dose range 100-1000 Gy. The dose response of MTT solution increases linearly with increase of dose, which can be seen from an increase of the individual relative absorbance-dose curve (see FIG. 1). As the dose increases, more hydrated electrons and free radicals are generated leading to breakage of N—N$^+$ bonds, resulting in an increase in the formation of colored formazan. The results show that dose response increases with increase of dye concentration, indicating that MTT dosimeter solution containing higher concentrations of the MTT dye are more suitable for high dose dosimetry.

Figure 2:
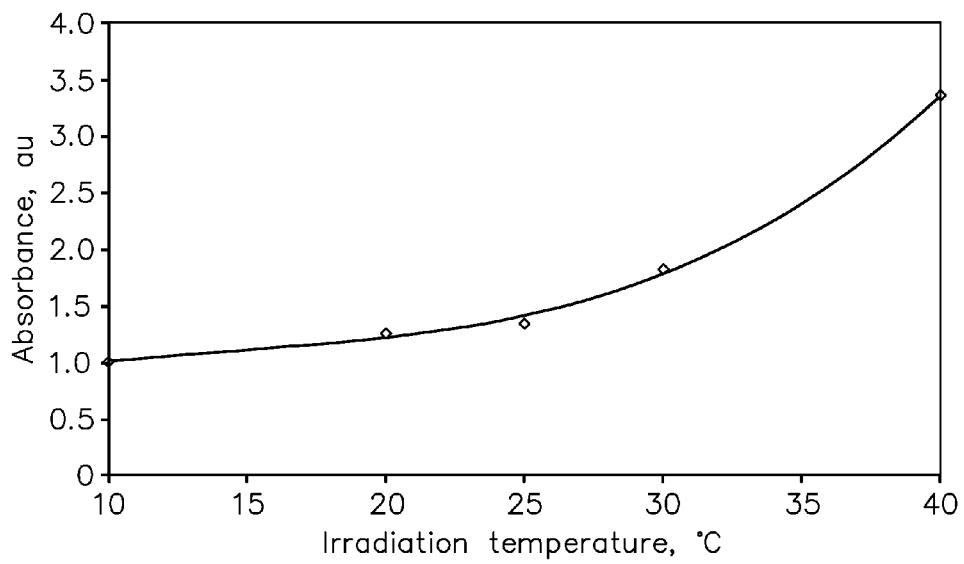
FIG. 2 Absorbance of 0.3 mM of MTT solution dosimeter normalized with respect to that at an irradiation temperature of 10° C. as a function of irradiation temperature.

The effect of irradiation temperature of MTT solutions were investigated by irradiating solution samples containing 0.3 mM MTT dye to 500 Gy in the temperature range of 10-40° C. A set of three samples was used for each temperature. The variation in absorbance of the samples was normalized with respect to that at an irradiation temperature of 10° C. (see FIG. 2). The results show that MTT solution dosimeters are very sensitive to irradiation temperature. Therefore, the response has to be corrected under actual processing conditions.

Figure 3:
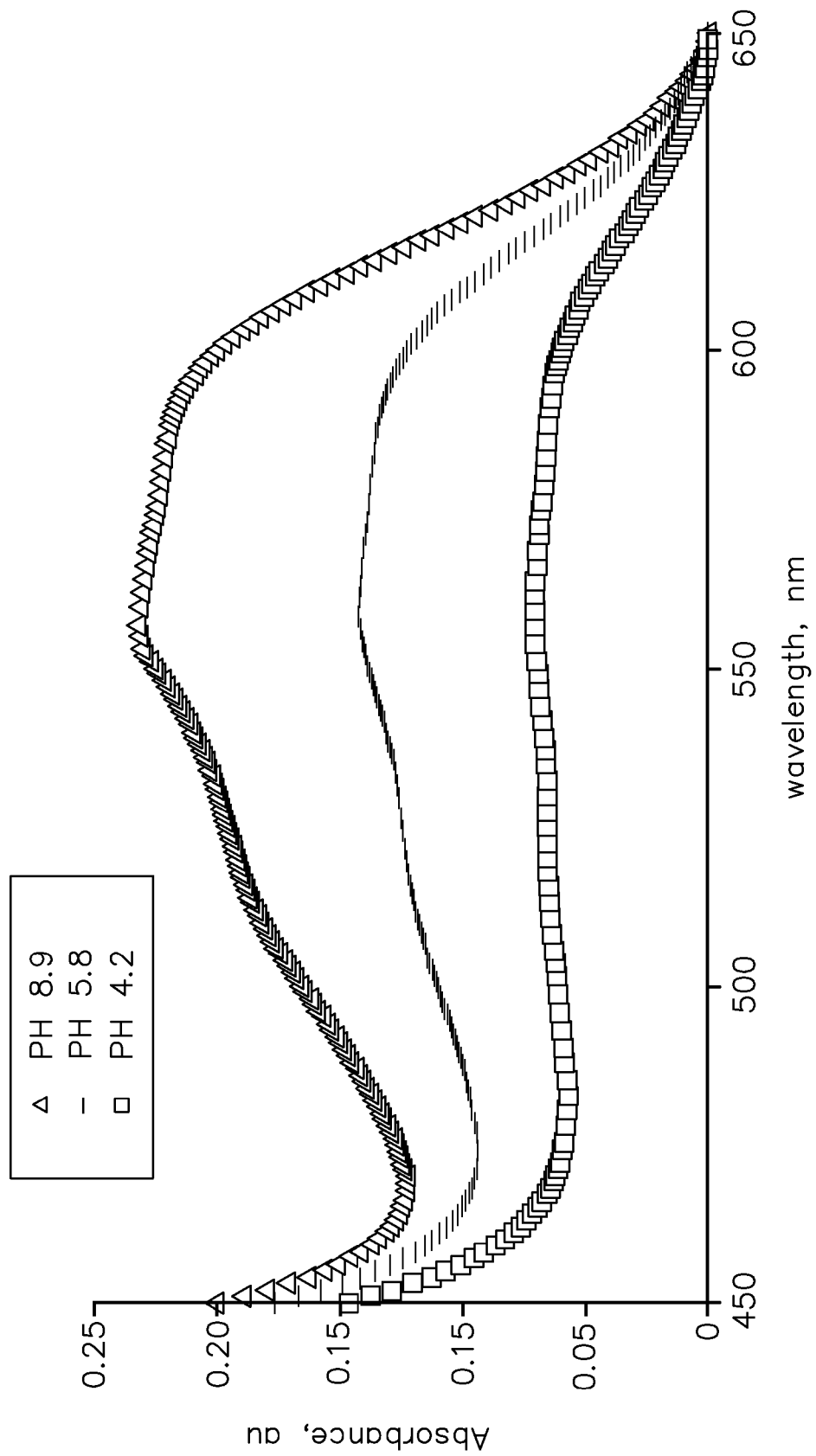
FIG. 3 Absorbance of 0.3 mM of MTT solution dosimeter with different pH levels irradiated at 25° C. to 500 Gy.

The effect of pH on MTT solutions were investigated by irradiating solution samples containing 0.3 mM MTT dye with different pH values to 500 Gy at irradiation temperature of 25±1° C. A set of three samples was used for each pH values. FIG. 3 shows that the response of MTT solution dosimeters increases with increase of pH values due to competition of H+ for the solvated electrons and the instability of the dye.

Figure 4:
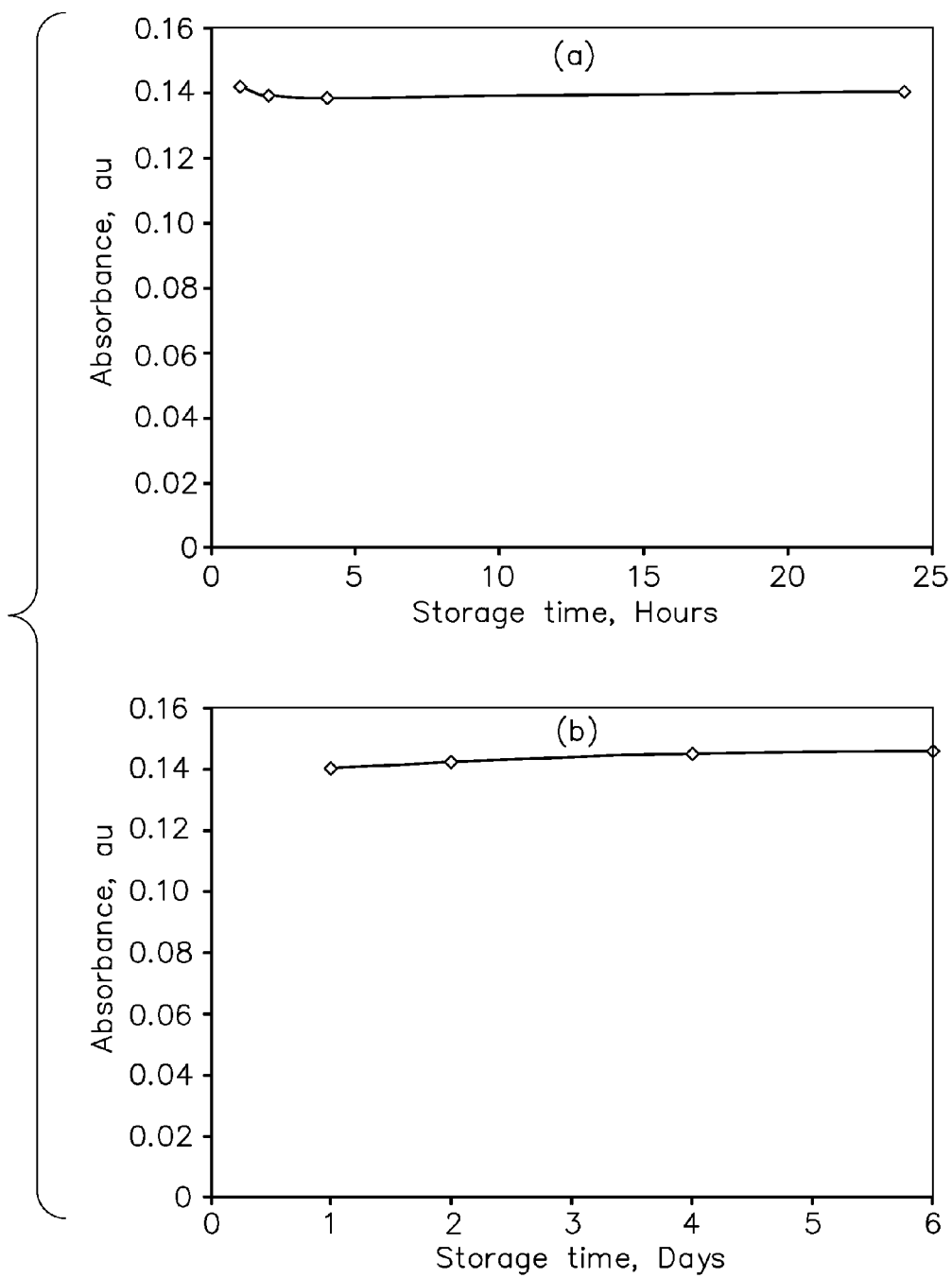
FIG. 4 Absorbance of irradiated 0.3 mM of MTT solution dosimeter to 500 Gy as a function of storage time, (a) hours unit and (b) days.

The stability of MTT solution dosimeters was tested by irradiating MTT solution containing 0.3 mM MTT dye to 500 Gy and storing under normal laboratory conditions in the dark. A set of three samples was used for each absorbed dose. The results show no change (less than ±2%; 1σ) in the absorbance of the MTT dosimeters up to 6 days (see FIGS. 4 (a and b)).

In order to increase the dose range and ease of handling of invented dosimeter as routine dosimeter, MTT-PVA film dosimeters are described in this disclosure. Polyvinyl alcohol (PVA) solutions were prepared by dissolving 7.2 g of PVA powder (Mw=108,000 g/M, Polysciences Inc., USA) in 90 ml distilled water at temperature of 80° C. The solution was magnetically stirred at this temperature for 4 hours and then left to cool to room temperature. After cooling to room temperature, PVA solution was divided into 30 ml samples. Then, different concentrations of MTT 1, 3 and 5 mM were added to 30 ml PVA solution. Mixtures were stirred continuously for 24 hours using a magnetic stirrer in order to obtain a uniform mixed dye-PVA solution. MTT-PVA solutions were poured onto a high levelled horizontal glass plates and dried at room temperature for about 72 hours. Films were peeled off and cut into 1×3 cm pieces, dried, stored and prepared for irradiation. The drying is completed once the weight of the films was constant. The films were protected from sunlight, fluorescent light, moisture and dust by storing them in small paper envelop and wrapping them with black plastic tape. The thickness of the film is 60±3 μm with a very good uniformity.

MTT-PVA films were irradiated with 1.25 MeV gamma-ray from $^{60}$Co source Model GC-220 supplied by MDS Nordion, Canada at a mean dose rate of 8.6 kGy/h which is connected to an air chiller system. Irradiations were conducted at room temperature. Three samples were irradiated for each absorbed dose, but no significant differences in their characteristics were found during measurements.

A range of 12-75% relative humidity levels were used to study the effect of humidity on the performance of MTT film dosimeters during irradiation. These humidity levels were achieved using the following saturated salt solutions: LiCl (12%), $MgCl_2 \times 6H_2O$ (34%), $Mg(NO_3)_2 \times 6H_2O$ (55%) and NaCl (75%) according to the technique devised by (Levine, H., McLaughlin, W. L., Miller, A., 1979. Temperature and humidity effects on the Gamma-ray response and stability of plastic and dyed plastic dosimeters. *Radiat. Phys. Chem.* 14, 551-574). The films were irradiated in a given humidity environment and were kept in the same environment for 3 days before irradiation to ensure equilibrium conditions.

The effect of the dye concentrations on the response of the dosimeter films was investigated in different compositions of MTT-PVA films. The dose response curves were established in terms of change in absorption peak measured at 560 nm per thickness in mm $\Delta A$ ($\Delta A = A_x - A_0$) versus the absorbed dose, where $A_x$ and $A_0$ are absorbance values at 560 nm for irradiated and un-irradiated films. Dose response of MTT-PVA films is shown in FIG. 5.

Figure 5:
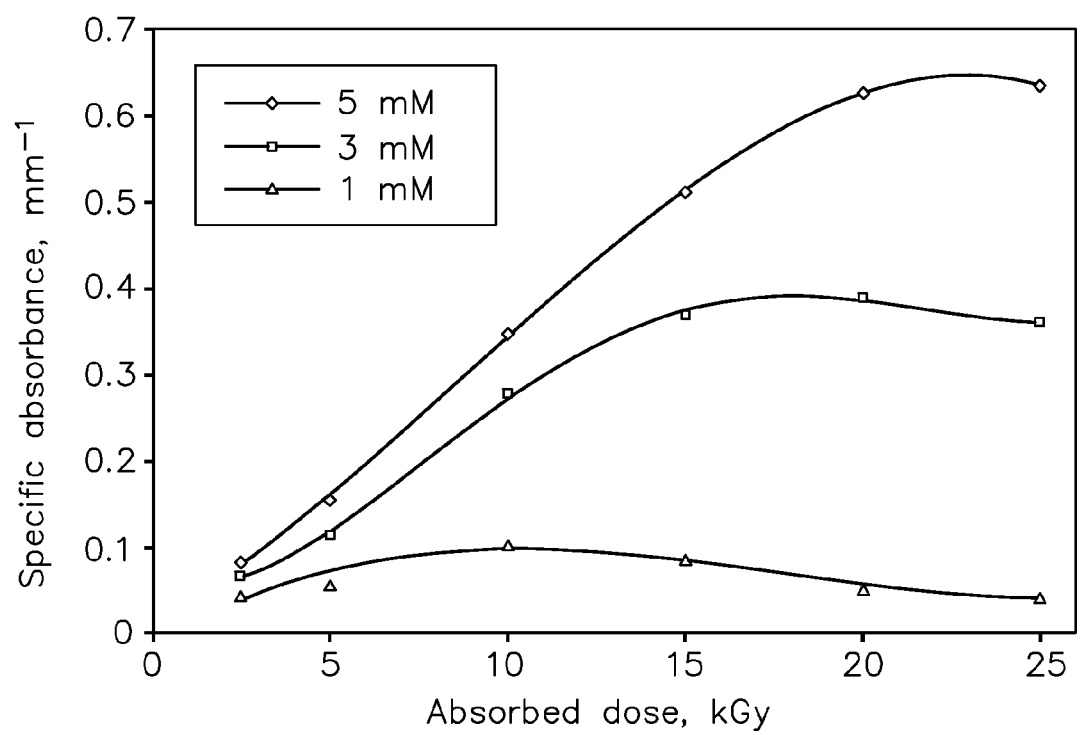
FIG. 5 Specific absorbance at 560 nm of 1, 3, and 5 mM of MTT-PVA film dosimeter as a function of absorbed dose FIG. 6 Specific absorbance of 5 mM of MTT-PVA film dosimeters normalized with respect to that at an irradiation temperature of 10° C. as a function of irradiation temperature for (a) 10 kGy and (b) 20 kGy.

The dose response of MTT-PVA film increases with increase of absorbed dose, which can be seen from the increase of the individual relative absorbance-dose curve (see FIG. 5). As the dose increases, more hydrated electrons and free radicals are generated leading to breakage of N—N$^+$ bonds, resulting in an increase in the formation of colored formazan. The results show that dose response increases with increase of dye concentration, indicating that MTT-PVA dosimeter films containing higher concentrations of the MTT dye are more suitable for high dose dosimetry.

Figure 6:
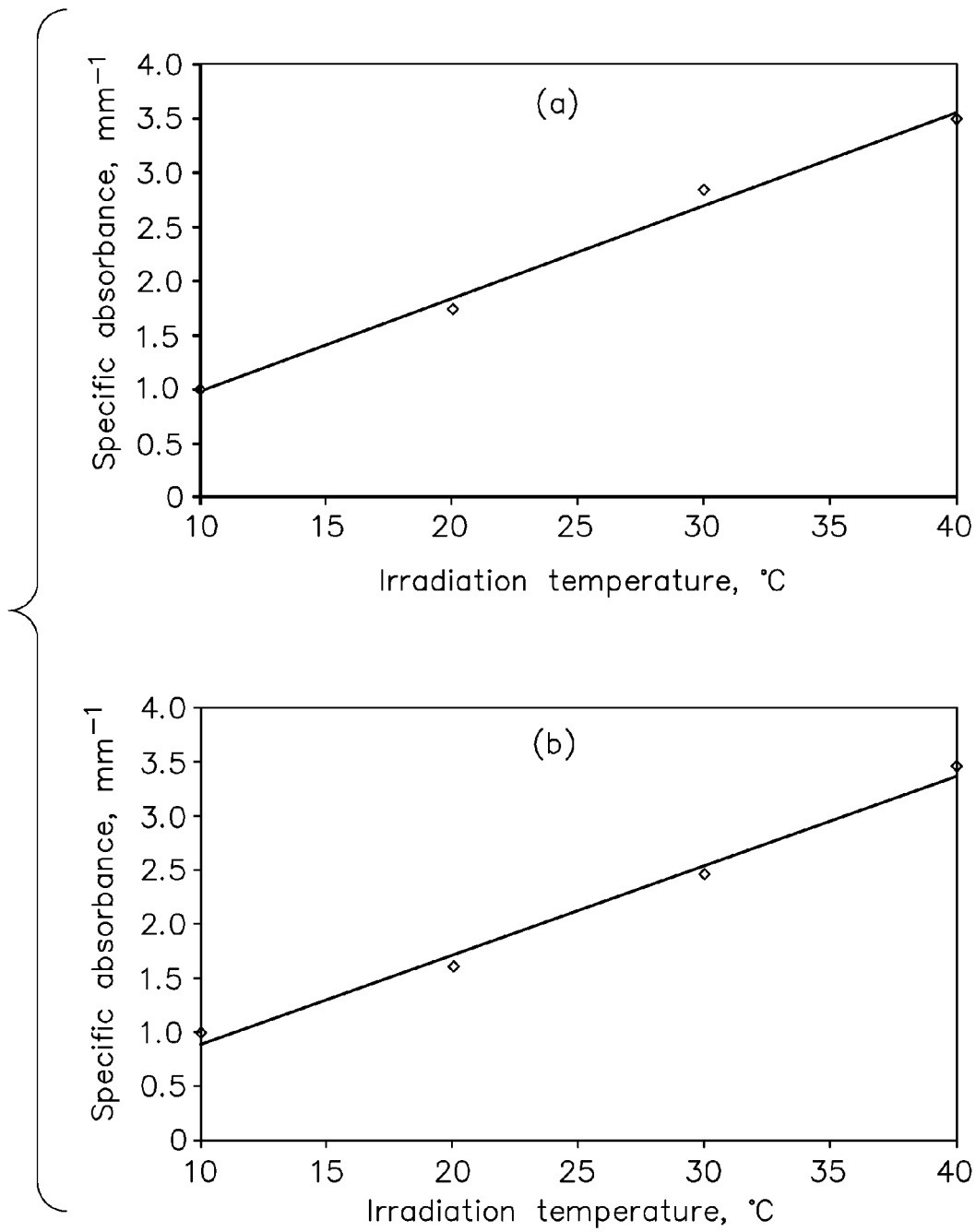

The effect of irradiation temperature of MTT-PVA films were investigated by irradiating film samples containing 5 mM MTT dye to 10 kGy and 20 kGy in the temperature range of 10-40° C. A set of three films was used for each temperature. The variation in absorbance of the films were normalized with respect to that at an irradiation temperature of 10° C. (see FIGS. 6 (a and b). The results show that the response of MTT-PVA films increased reasonably with increase of irradiation temperature.

Figure 7:
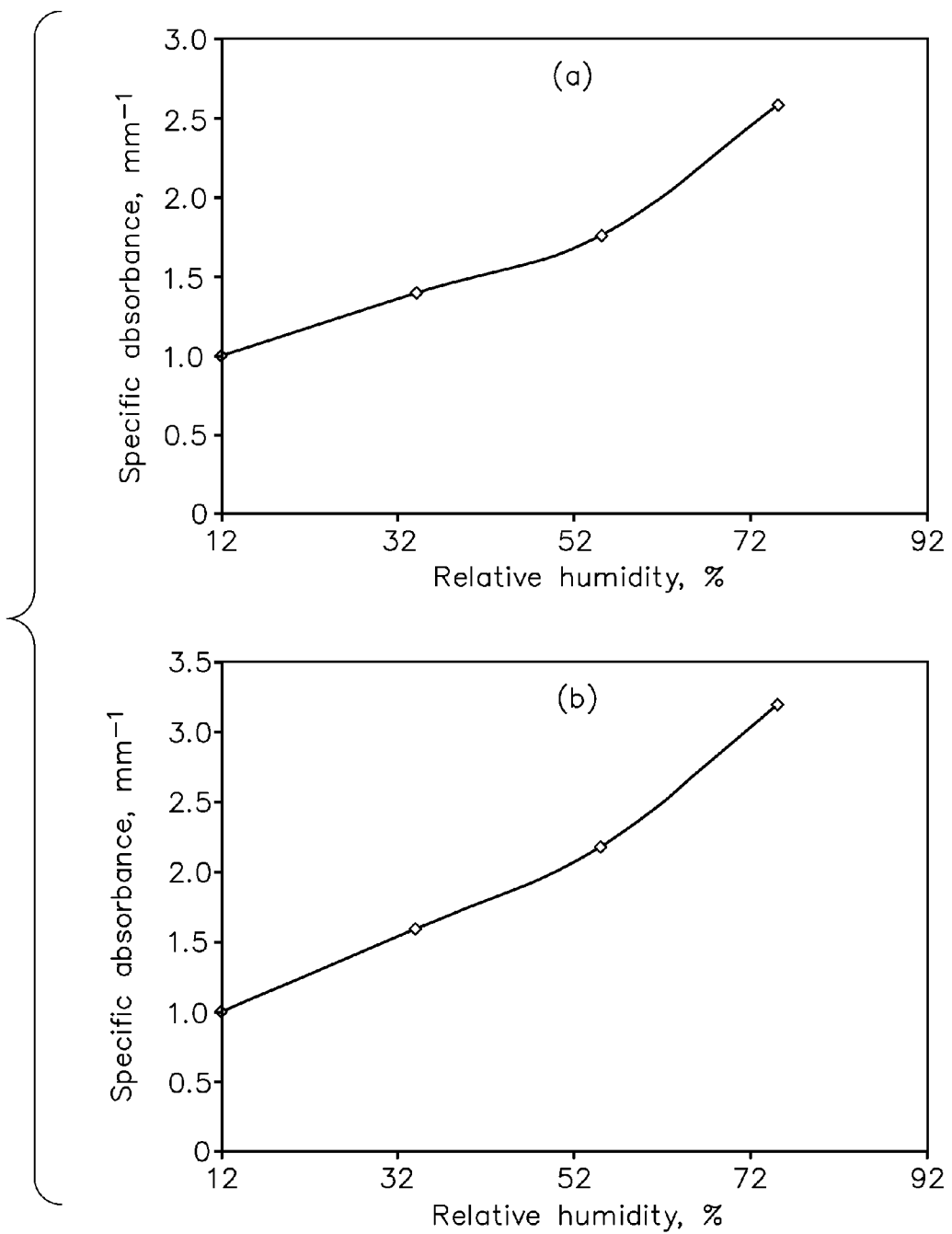
FIG. 7 Specific absorbance of 5 mM of MTT-PVA film dosimeter normalized with respect to that at 12% relative humidity at (a) 10 kGy and (b) 20 kGy.

The effect of humidity on the MTT-PVA film dosimeter was investigated by storing film samples containing 5 mM MTT dye in vials in different humidity levels (12%, 34%, 55% and 74% relative humidity) for three days, then the films were irradiated in the same vials to 10 and 20 kGy. A set of three films was used for each vial. The variation in absorbance of the irradiated films (10 and 20 kGy) were normalized with respect to that at 12% relative humidity (see FIGS. 7 (a and b). The results show that the response of MTT-PVA films increased significantly with increase of relative humidity.

Figure 8:
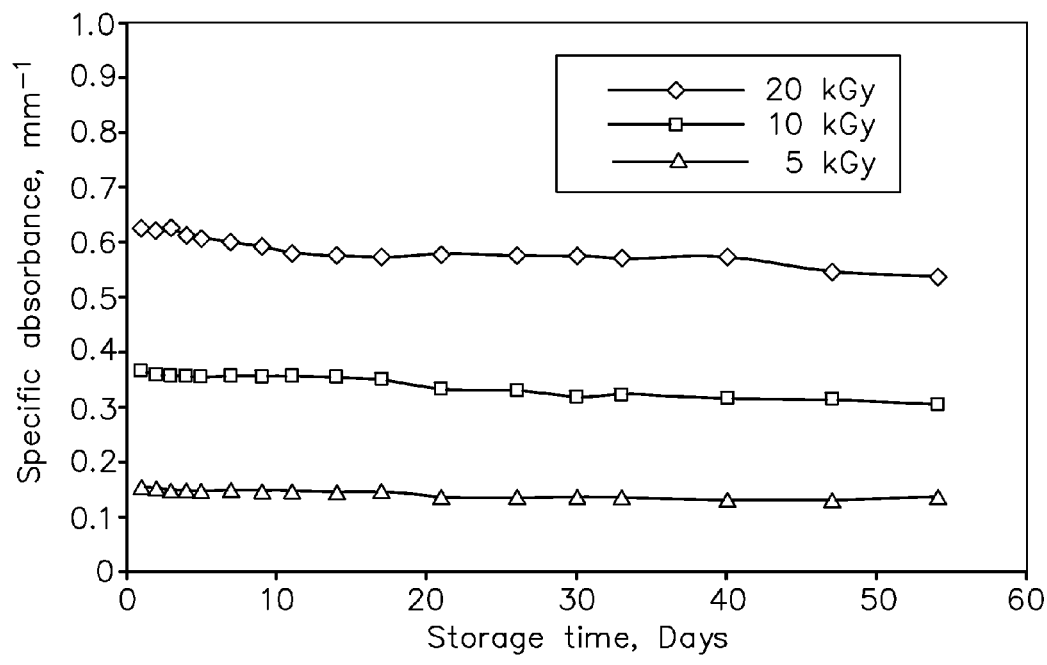
FIG. 8 Specific absorbance of irradiated 5 mM of MTT-PVA film dosimeter for different absorbed doses.

The stability of MTT-PVA films were tested by measuring the absorbance of films containing 5 mM MTT. MTT-PVA films were irradiated to 5, 10 and 20 kGy and kept under normal laboratory conditions in the dark. A set of three films was used for each absorbed dose. The results show no change (less than ±5%; 1σ) in the specific absorbance of the films up to 54 days (see FIG. 8).

Figure 9:
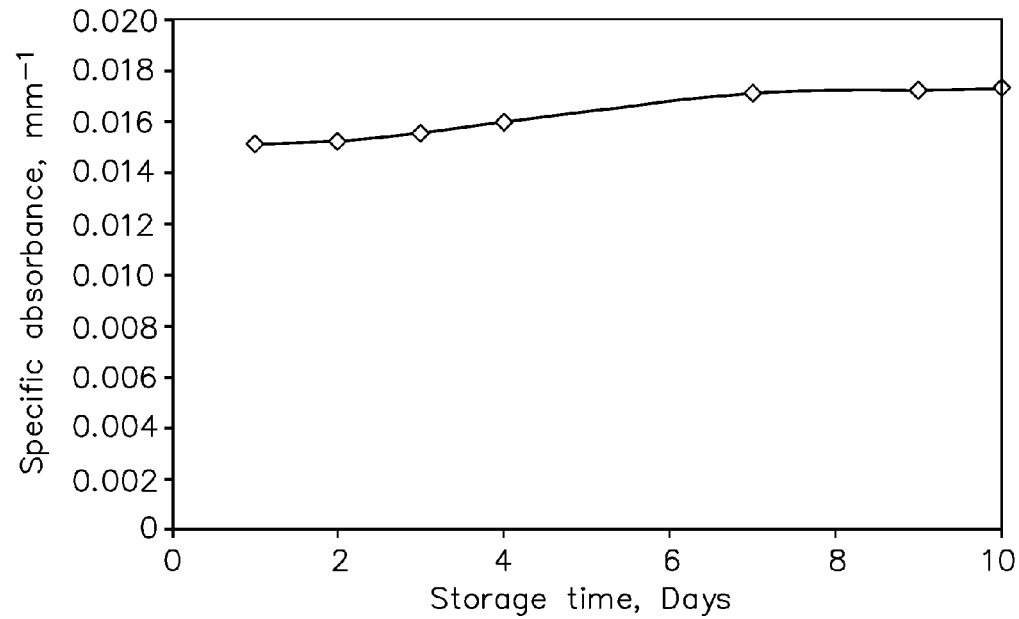
FIG. 9 Specific absorbance of un-irradiated 5 mM of MTT-PVA film dosimeter in the dark as a function of storage time.
Figure 10:
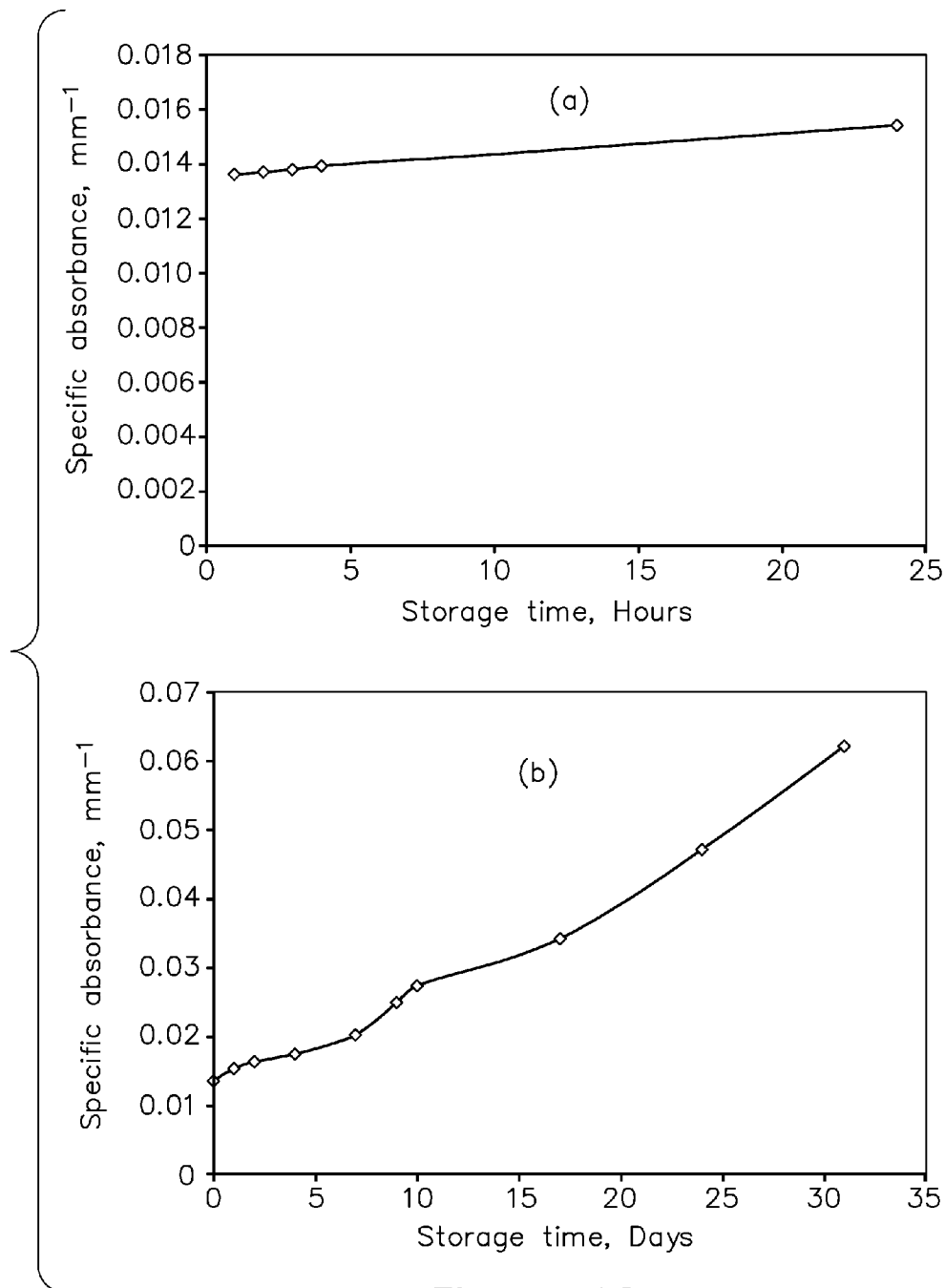
FIG. 10 Specific absorbance of un-irradiated 5 mM of MTT-PVA film dosimeters under fluorescent light as a function of storage time, (a) hours unit and (b) days.

The stability of un-irradiated MTT-PVA film was also investigated under dark up to 10 days and under fluorescent light up to 30 days as shown in FIG. 9, and FIGS. 10 (a and b), respectively. The results show no change (less than 6%; 1σ) in the specific absorbance of the un-irradiated films PVA films up to 10 days in the dark. A significant change (more than 116%; 1σ) in the specific absorbance of the un-irradiated films PVA films up to 31 days under fluorescent light was observed.

Figure 11:
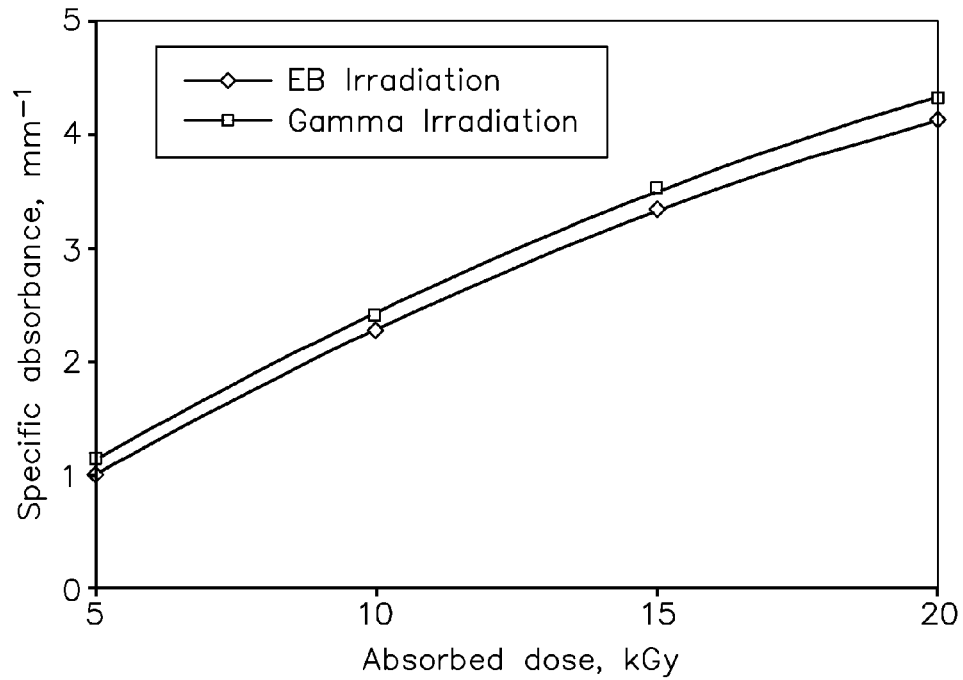
FIG. 11 Specific absorbance of 5 mM of MTT-PVA film dosimeter irradiated with gamma ray and with electron beam to different absorbed doses.

The effect of dose rate on the response of MTT-PVA film dosimeters was investigated using 1.25 MeV gamma-ray from $^{60}$Co source at a mean dose rate of 8.6 kGy/h and an electron beam accelerator at mean dose rate of 1 kGy/s, relative humidity of 50% and at temperature of 25° C. for irradiation at absorbed doses of 10, 20, 30 and 40 kGy. Three dosimeters were irradiated at each absorbed dose. It was found that there is no appreciable effect of dose rate on MTT-PVA film dosimeters (see FIG. 11).

Polyvinyl alcohol has low threshold to react to high humidity. In order to circumvent this problem, polyvinyl butyral (PVB) was used in another embodiment. Polyvinyl butyral (PVB) solutions were prepared by dissolving 15 g of PVB powder (Mw=36,000 g/M, Wacker, USA) in 150 ml 96% ethanol at temperature of 50° C. The solution was magnetically stirred at this temperature for 4 hours and then left to cool to room temperature. After cooling to room temperature, PVB solution was divided into three parts. PVB composites were prepared by dissolving different concentrations of MTT (i.e. 1, 2.5 and 5 mM) in the three parts of PVB solutions, respectively. Mixtures were stirred continuously for 24 hours using a magnetic stirrer in order to obtain a uniformly dyed PVB solution. MTT-PVB solutions were poured onto a highly leveled horizontal glass plates and dried at room temperature for about 72 hours. Films were peeled off and cut into 1×3 cm pieces, dried, stored and prepared for irradiation. The drying is completed when the weight of the films is constant. The films were protected from sunlight, fluorescent light, moisture and dust by storing them in small paper envelop and wrapping them with black plastic tape. The thickness of the film is 250±10 µm with a very good uniformity. The irradiation of MTT-PVB films were carried out as mentioned previously for MTT-PVA films.

Figure 12:
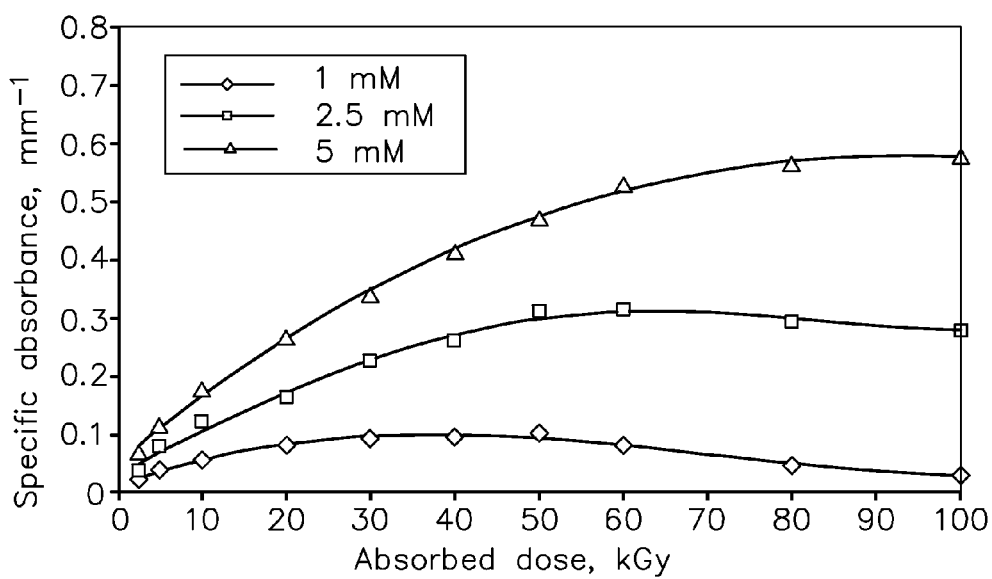
FIG. 12 Specific absorbance at 560 nm of 1, 2.5 and 5 mM of MTT-PVB film dosimeter as a function of absorbed dose.
Figure 13:
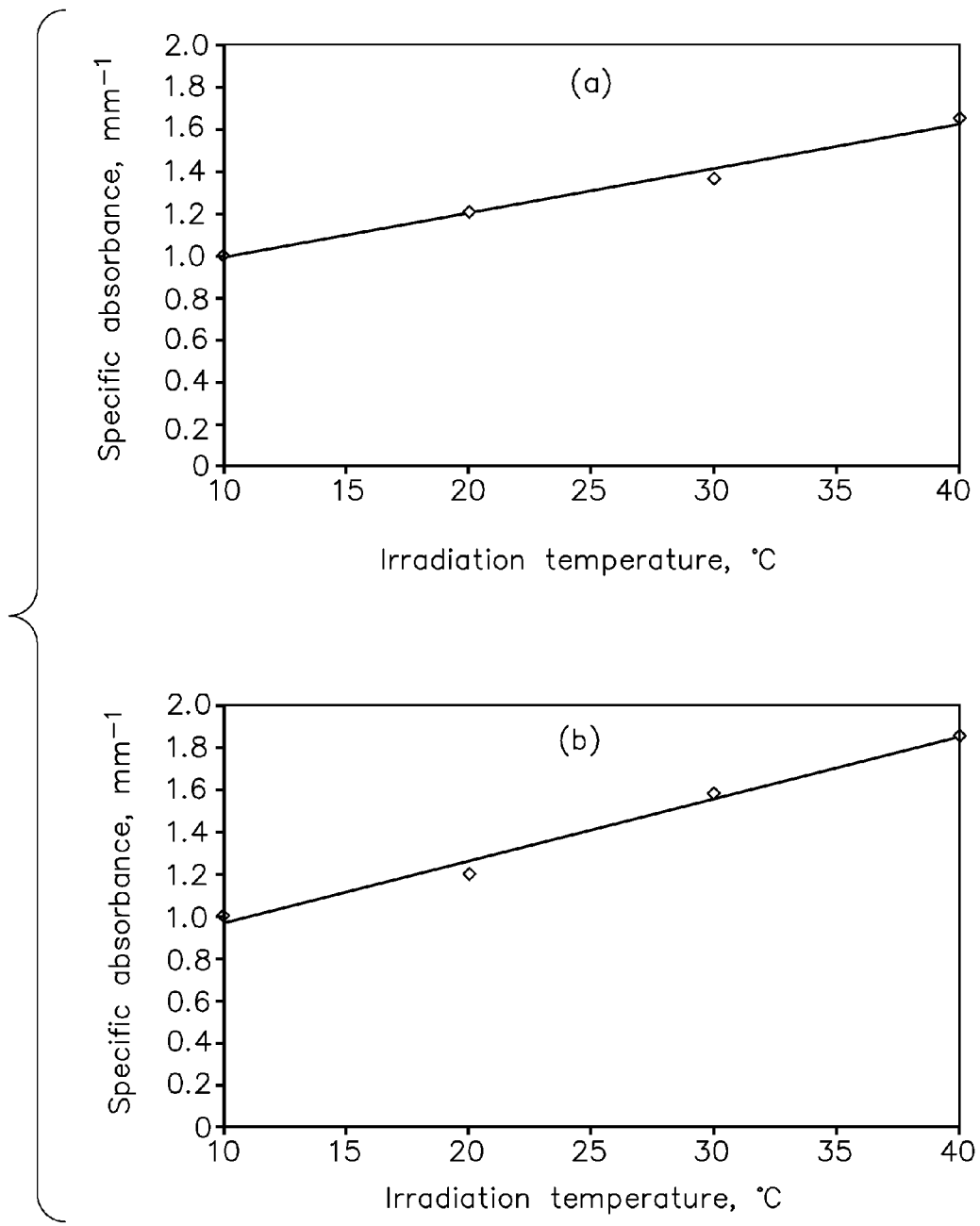
FIG. 13 Specific absorbance of 5 mM of MTT-PVB film dosimeter normalized with respect to that at an irradiation temperature of 10° C. as a function of irradiation temperature for (a) 10 kGy and (b) 20 kGy.

The effect of the dye concentrations on the response of the film dosimeter was investigated in different compositions of MTT-PVB films. The dose response curves were established in terms of change in absorption peak measured at 560 nm per thickness in mm versus the absorbed dose. Dose response of MTT-PVB films is shown in FIG. 12. The dose response of MTT-PVB film increases with increase of absorbed dose, which can be seen from an increase of the individual relative absorbance-dose curve (see FIG. 12). As the dose increases, more hydrated electrons and free radicals are generated leading to breakage of N—N$^+$ bonds, resulting in an increase in the formation of colored formazan. The results show that dose response increases with increase of dye concentration, indicating that MTT-PVB film dosimeter containing higher concentrations of the MTT dye are more suitable for high dose dosimetry. Previous study of MTT-PVA films demonstrated that the dose response tended to saturate after 20 kGy. Therefore, these new composites of MTT-PVB film dosimeter with high dose range have more potential for high dose applications The effect of irradiation temperature of MTT-PVB films was investigated by irradiating film samples containing 5 mM MTT dye to 10 kGy and 20 kGy in the temperature range of 10-40° C. A set of three films was used for each irradiation temperature. The variation in absorbance of the films were normalized with respect to that at an irradiation temperature of 10° C. (see FIGS. 13 (*a* and *b*)). The results show that MTT-PVB films are less sensitive to irradiation temperature than MTT-PVA films. The response of MTT-PVB has to be corrected under actual processing conditions (Sharpe, P. H. G., Miller, A., Sephton, J. P., Gouldstone, C. A., Bailey, M., Helt-Hansen, J. 2009. The effect of irradiation temperatures between ambient and 80° C. on the response of alanine dosimeters. *Radiat. Phys. Chem.* 78, 473-475).

Figure 14:
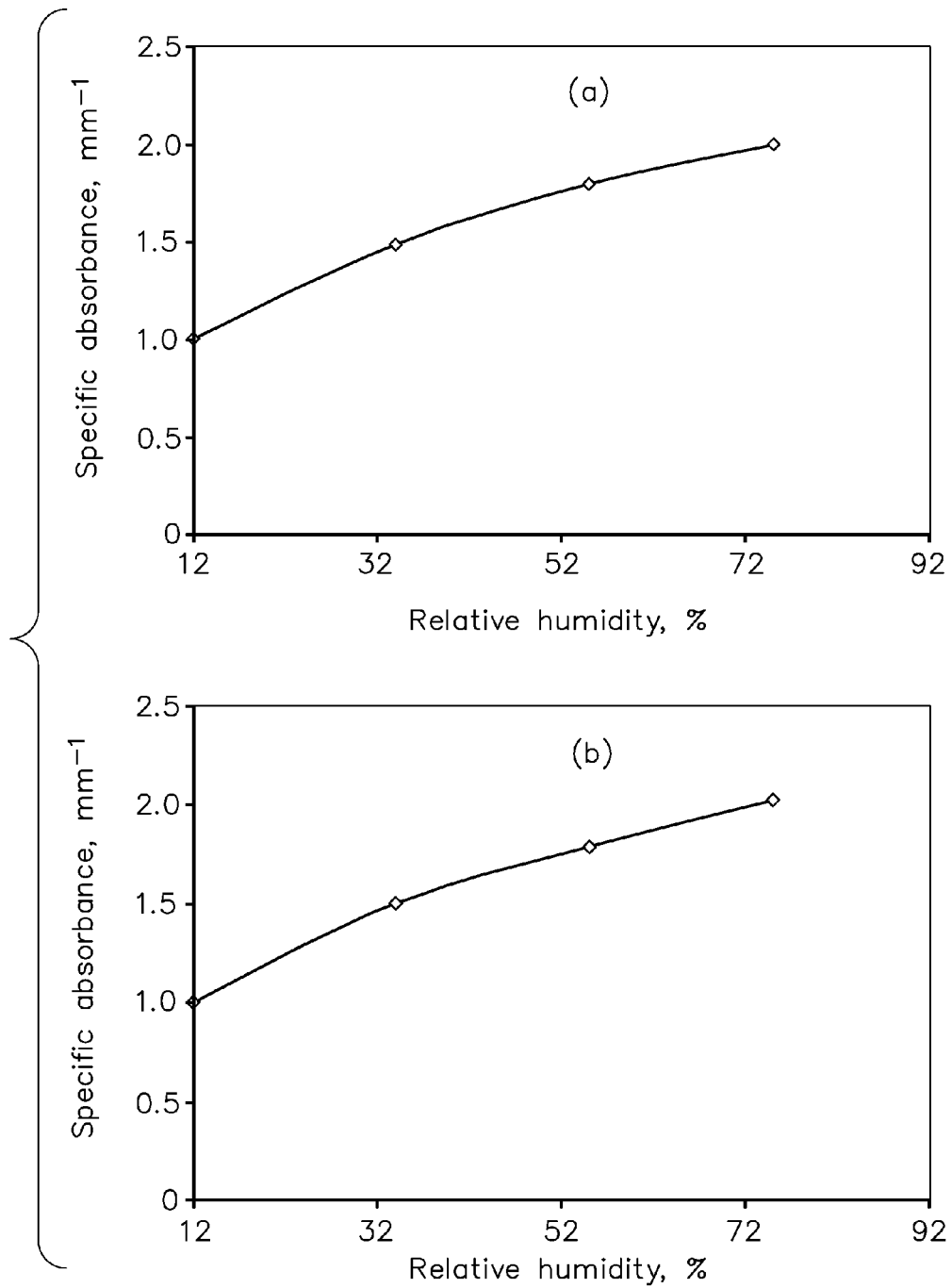
FIG. 14 Specific absorbance of 5 mM of MTT-PVB film dosimeter normalized with respect to that at 12% relative humidity at (a) 10 kGy and (b) 20 kGy.

The effect of humidity on MTT-PVB film dosimeters were investigated by storing film samples containing 5 mM MTT dye in vials in different humidity levels (12%, 34%, 55% and 74% relative humidity) for three days, then the films were irradiated in the same vials to 10 and 20 kGy. A set of three films was used for each humidity level. The variation in absorbance of the irradiated films (10 and 20 kGy) were normalized with respect to that at 12% relative humidity (see FIGS. 14 (*a* and *b*)). The results show that the dose response of MTT-PVB film is not as sensitive to relative humidity as MTT-PVA film.

Figure 15:
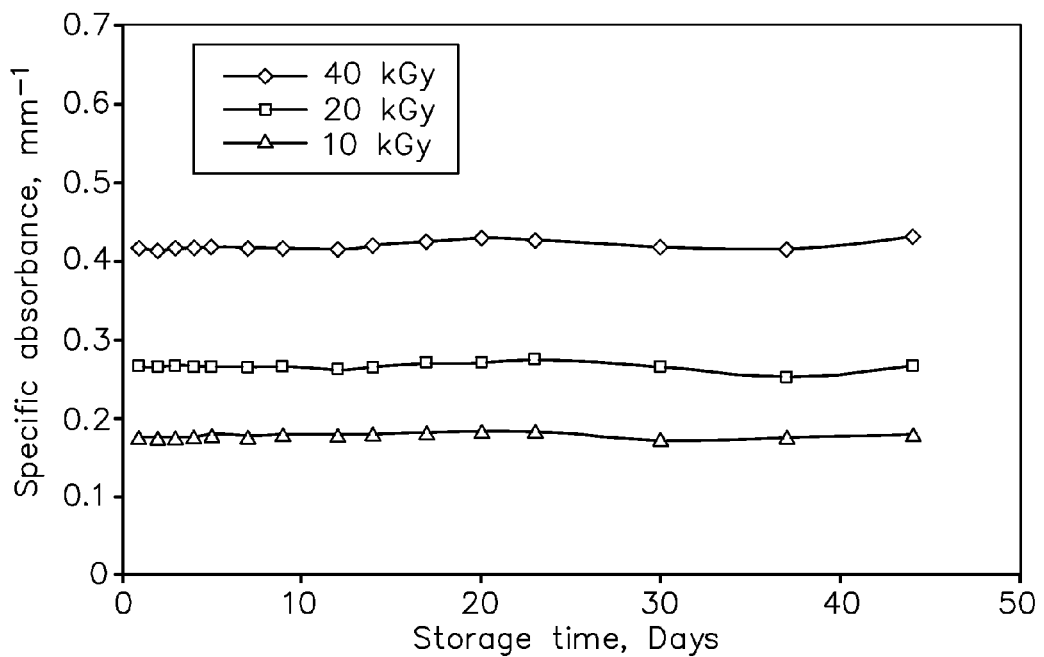
FIG. 15 Specific absorbance of irradiated 5 mM of MTT-PVB film dosimeter for different absorbed doses.
Figure 16:
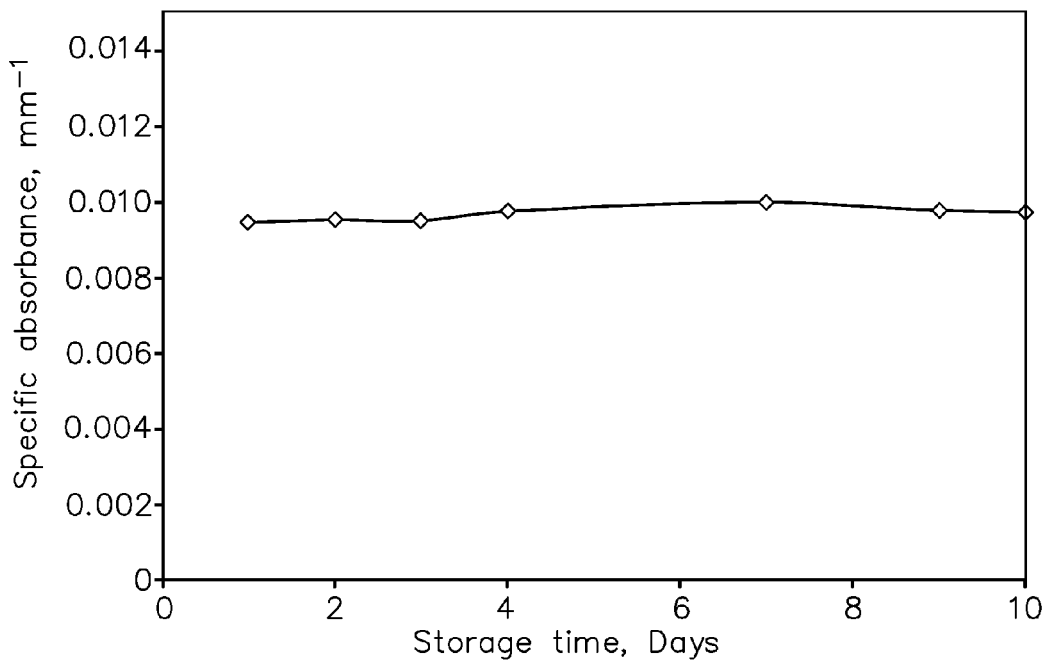
FIG. 16 Specific absorbance of un-irradiated 5 mM of MTT-PVB film dosimeter in the dark as a function of storage time.
Figure 17:
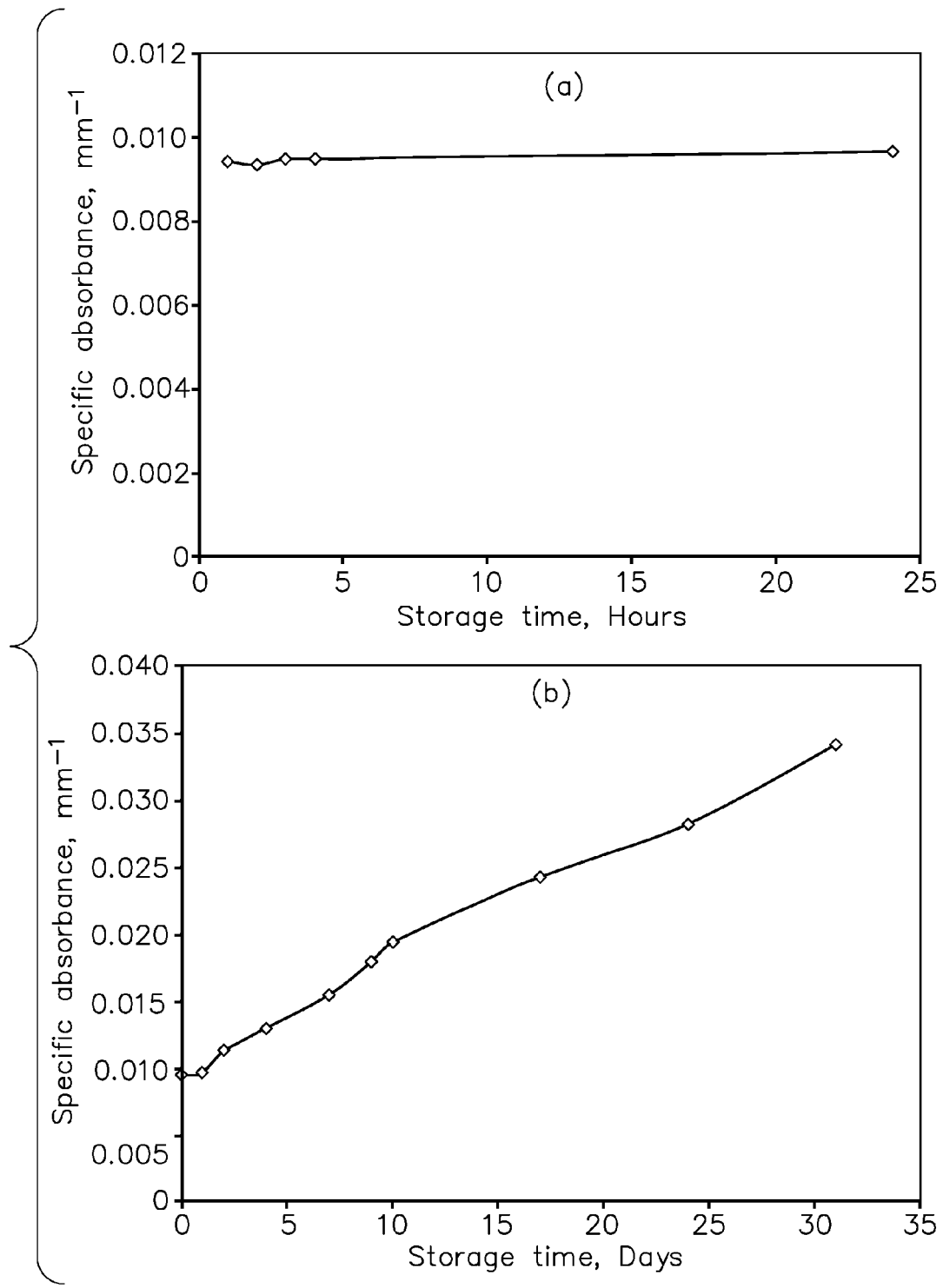
FIG. 17 Specific absorbance of un-irradiated 5 mM of MTT-PVB film dosimeter under fluorescent light as a function of storage time, (a) hours and (b) days.

The stability of MTT-PVB films were tested by measuring the absorbance of films containing 5 mM MTT. MTT-PVB films were irradiated to 10, 20 and 40 kGy and kept under normal laboratory conditions in the dark. A set of three films was used for each absorbed dose. The results show no change (less than ±2%; 1σ for MTT-PVB) in the specific absorbance of the PVB up to 44 days (see FIG. 15). The stability of un-irradiated MTT-PVB films were also investigated under dark up to 10 days and under fluorescent light up to 31 days as shown in FIG. 16 and FIGS. 17 (*a* and *b*). The results show no change (less than ±2%; 1σ for MTT-PVB) in the specific absorbance of the un-irradiated films PVB up to 10 days in the dark. A significant change (more than ±88%; 1σ for MTT-PVB) in the specific absorbance of the un-irradiated PVB films up to 31 days under fluorescent light was observed.

Figure 18:
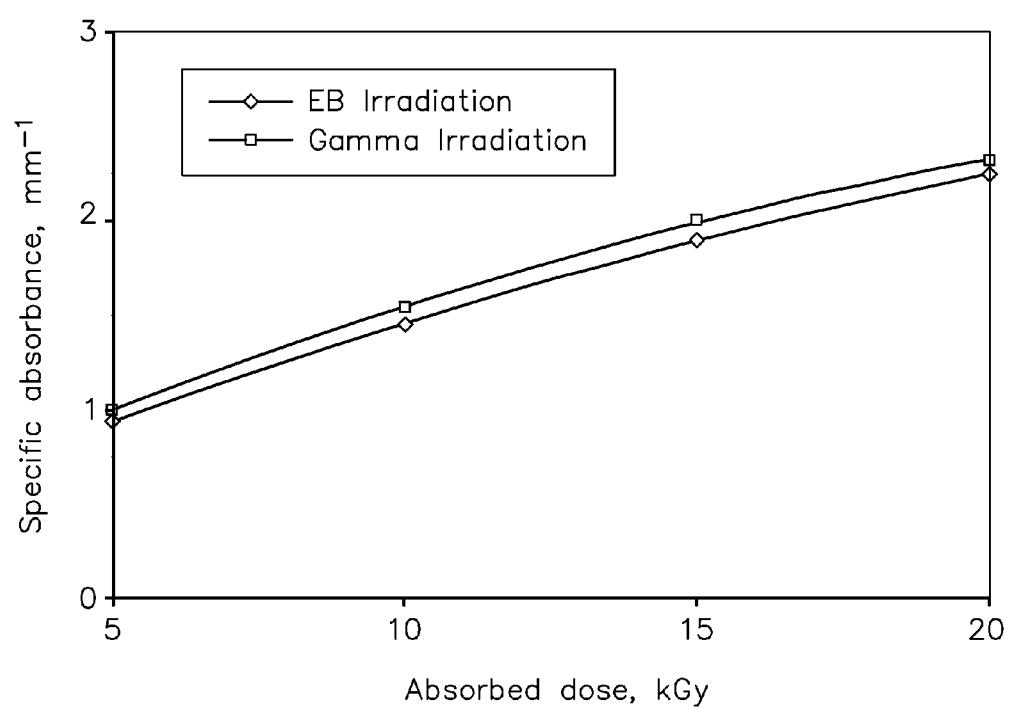
FIG. 18 Specific absorbance of 5 mM of MTT-PVB film dosimeter irradiated with gamma ray and with electron beam to different absorbed doses.

The effect of dose rate on the response of MTT-PVB film dosimeters was investigated using 1.25 MeV gamma-ray from $^{60}$Co source at a mean dose rate of 8.6 kGy/h and an electron beam accelerator at a mean dose rate of 1 kGy/s, relative humidity of 50% and at temperature of 25° C. for irradiation at absorbed dose of 10, 20, 30 and 40 kGy. Three dosimeters were irradiated for each absorbed dose. It was found that there is no appreciable effect of dose rate on MTT-PVB film dosimeters (see FIG. 18).

In addition, it will be appreciated that the various compositions, films, solution composition in combination with films, method of use for irradiation measurement, process of making the composition and film disclosed herein may be embodied using means for achieving the various irradiation dose response and results of irradiation. Accordingly, the specification and drawings are to be regarded in an illustrative rather than a restrictive sense.

What is claimed is:

1. A process, comprising:
dissolving a tetrazolium bromide dye to make a solution;
dissolving a polymer solution using a solvent;
mixing the tetrazolium dye and the polymer solution to make a film for measuring an irradiation
heating the solvent to 80° C. to dissolve the polymer to make the polymer solution;
stirring the polymer solution using a magnetic stirrer for four hours;
cooling the polymer solution to room temperature;
adding the tetrazolium dye at a 1-5 mM concentration range to the polymer solution to make a mixture;
stirring the mixture of polymer solution and tetrazolium bromide dye solution for 24 hours;
pouring the mixture on a flat glass plate to form a uniform film layer of a specific thickness;
drying the film till a constant weight for the film is obtained;
cutting the film to a specific dimension for further use to measure irradiation; and
storing the film in black plastic to protect from light, moisture and dust.

2. The process of claim 1, wherein the tetrazolium bromide dye is 3-(4,5-Dimethylthiazol-2-yl)-2,5-diphenyltetrazolium bromide (MTT).

3. The process of claim 1, wherein the polymer to make the film for a dosimeter is at least one of a polyvinyl alcohol and polyvinyl butyral.

4. The process of claim 1, wherein the solvent is at least one of an ethanol and distilled water.

5. The process of claim 1, wherein the specific thickness is between 55-65 µm.

6. A method, comprising:
heating a solvent to 50° C. to dissolve a polymer to make a polymer solution;
stirring the polymer solution using a magnetic stirrer for four hours;
cooling the polymer solution to room temperature;
adding a tetrazolium dye at a 1-5 mM concentration range to make a mixture;
stirring the mixture of the polymer solution and the tetrazolium dye solution for 24 hours;

pouring the mixture on a flat glass plate to form a uniform film layer of a specific thickness; wherein the specific thickness is between 240-260 μm;

drying the uniform film layer till a constant weight for a film is obtained;

cutting the film to a specific dimension for further use to measure irradiation using a dosimeter; and storing the film in black plastic to protect from light, moisture and dust.

7. The method of claim 6, further comprising:

optimizing the film at least for one of a irradiation temperature, stability, relative humidity and dose rate.

8. The method of claim 6, wherein the tetrazolium bromide dye is 3-(4,5-Dimethylthiazol-2-yl)-2,5-diphenyltetrazolium bromide (MTT).

9. The method of claim 6, wherein the polymer to make the film for the dosimeter is at least one of a polyvinyl alcohol and polyvinyl butyral.

10. The method of claim 6, wherein the solvent is at least one of an ethanol and distilled water.

* * * * *